(12) United States Patent
Ikeyama (10) Patent No.: US 7,825,977 B2
(45) Date of Patent: Nov. 2, 2010

(54) IMAGE PICKUP APPARATUS AND IMAGE PICKUP METHOD

(75) Inventor: Hiromasa Ikeyama, Tokyo (JP)

(73) Assignee: Sony Corporation, Tokyo (JP)

(*) Notice: Subject to any disclaimer, the term of this patent is extended or adjusted under 35 U.S.C. 154(b) by 396 days.

(21) Appl. No.: 12/054,722

(22) Filed: Mar. 25, 2008

(65) Prior Publication Data

US 2008/0239089 A1    Oct. 2, 2008

(30) Foreign Application Priority Data

Mar. 27, 2007   (JP) ................ P2007-082069

(51) Int. Cl.
*H04N 3/14* (2006.01)
*H04N 5/228* (2006.01)

(52) U.S. Cl. .................. 348/312; 348/222.1

(58) Field of Classification Search ............ 348/312
See application file for complete search history.

(56) References Cited

U.S. PATENT DOCUMENTS

| | | | |
|---|---|---|---|
| 6,580,457 B1 * | 6/2003 | Armstrong et al. | 348/317 |
| 7,015,965 B2 * | 3/2006 | Asada et al. | 348/312 |
| 7,548,265 B2 * | 6/2009 | Egashira et al. | 348/312 |
| 7,557,834 B2 * | 7/2009 | Kaneko et al. | 348/222.1 |
| 7,705,902 B2 * | 4/2010 | Matsuoka et al. | 348/333.01 |
| 2005/0046701 A1 * | 3/2005 | Kaneko et al. | 348/222.1 |
| 2007/0070212 A1 * | 3/2007 | Haneda | 348/222.1 |

FOREIGN PATENT DOCUMENTS

JP  2003 063471  7/2003

* cited by examiner

*Primary Examiner*—Ngoc-Yen T Vu
(74) *Attorney, Agent, or Firm*—Frommer Lawrence & Haug LLP; William S. Frommer (57) ABSTRACT

An image pickup method of picking up images at a frame rate changeably set out of a plurality of frame rates is provided. The method includes the steps of: setting a vertical synchronization cycle in accordance with a set frame rate and adding an image pickup signal that does not include a valid image pickup region in accordance with the set vertical synchronization cycle while keeping a horizontal synchronization cycle of each image pickup signal constant, when obtaining an image pickup signal from an image sensor; and correcting a time axis of an obtained image pickup signal that includes a valid image pickup region, correspondingly to the set frame rate and deleting an obtained image pickup signal that does not include the valid image pickup region.

5 Claims, 7 Drawing Sheets

FIG. 1A

FIG. 1B (60 FPS EXAMPLE)

FIG. 1C (50 FPS EXAMPLE)

FIG. 1D (24 FPS EXAMPLE)

FIG. 4B (60 FPS EXAMPLE)

FIG. 4C (50 FPS EXAMPLE)

FIG. 4D (24 FPS EXAMPLE)

FIG. 6A (60 FPS EXAMPLE)

FIG. 6B (50 FPS EXAMPLE)

FIG. 6C (24 FPS EXAMPLE)

FIG. 7

IMAGE PICKUP APPARATUS AND IMAGE PICKUP METHOD

CROSS REFERENCES TO RELATED APPLICATIONS

The present invention contains subject matter related to Japanese Patent Application JP 2007-082069 filed in the Japanese Patent Office on Mar. 27, 2007, the entire contents of which being incorporated herein by reference.

BACKGROUND OF THE INVENTION

1. Field of the Invention

The present invention relates to an image pickup apparatus applied to a video camera capable of image pickup at a variety of frame rates and to an image pickup method applied to such image pickup apparatus, and in particular to a technology suitable for an image pickup apparatus equipped with an image sensor that picks up an image in line sequence.

2. Description of the Related Art

In the past, a variety of video cameras that are capable of image pickup at different frame rates have been developed. There are a number of standards for the frame rate of an image signal, such as sixty frames per second, fifty frames per second, and twenty-four frames per second. Image signals at sixty frames per second are common in Japan and USA, while image signals at fifty frames per second are common in Europe. The frame rate at twenty-four frames per second is suitable for an image signal used in movies.

When image pickup is carried out corresponding to such a variety of image signal types using a single video camera, there are no problems so long as the base clock frequency of a synchronization signal used for image pickup (pixel clock frequency) can be changed in accordance with the different frame rates. However, this is not ideal since complex control is required to change the clock frequency in units of single pixels being picked up.

For this reason, it is customary to use the same base clock frequency for single pixel units when picking up images at different frame rates with the image sensor of a video camera, and to then process the picked-up image signal to convert the signal to a signal with a stipulated frame rate.

FIGS. 1A to 1D are diagrams showing an example of an existing frame rate converting process for the case where the base clock (pixel clock) frequency is fixed. The processing shown in FIGS. 1A to 1D is standardized according to SMPTE 274M or the like.

Figure 1A:
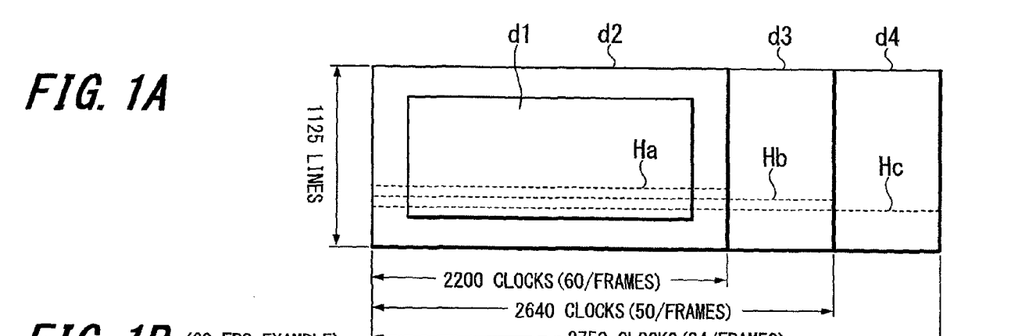
FIGS. 1A to 1D are a diagram and timing charts showing examples of existing processing that changes the frame rate by changing the horizontal synchronization cycle while keeping the base clock frequency constant.

FIG. 1A is an image of one frame in an image pickup signal. A valid image pickup region d1 with predetermined numbers of pixels in the horizontal direction and the vertical direction is set in the image pickup signal of a frame. The numbers of pixels in the horizontal direction and the vertical direction in the valid image pickup region d1 are the same in each frame rate. As one example, the valid image pickup region d1 is assumed to include 1920 pixels in the horizontal direction and 1080 lines in the vertical direction.

When images are picked up at 60 frames per second, a slightly wider image pickup region d2 than the valid image pickup region d1 is set as shown in FIG. 1A. The image pickup region d2 is assumed to include 2200 pixels in the horizontal direction and 1125 lines in the vertical direction.

Figure 1B:
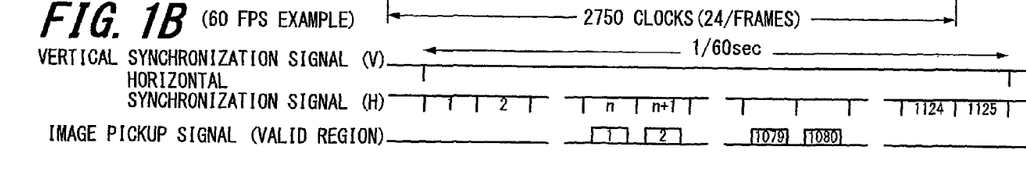

FIG. 1B shows a vertical synchronization signal V, a horizontal synchronization signal H, and an image signal of the valid region, when obtaining an image signal at 60 frames per second. For an image signal at 60 frames per second, an image pickup region d2 (that is, 2200 pixels in the horizontal direction and 1125 lines in the vertical direction) is repeatedly picked up in frame cycles. The image signal of the valid region is a signal of 1080 lines taken from a predetermined line ("n line") out of the 1125 horizontal lines. A signal for one horizontal line is shown by the broken line Ha in FIG. 1A, for example.

When images are picked up at 50 frames per second, as shown in FIG. 1A, an image pickup signal of a region (d2+d3) produced by adding an image pickup region d3 on the right of the image pickup region d2 to the region d2 is outputted from a read unit of the image sensor. The range set as the valid image pickup region d1 is the same as for image signals at 60 frames per second.

Figure 1C:
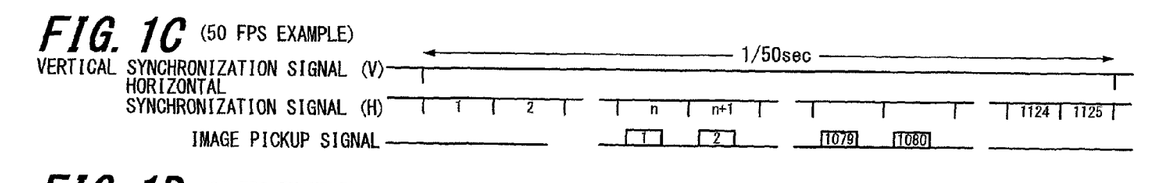

FIG. 1C shows the vertical synchronization signal V, the horizontal synchronization signal H, and the image pickup signal of the valid region, when obtaining an image signal at 50 frames per second. When obtaining an image signal at 50 frames per second, an image of an image pickup region d2+d3 (that is, 2640 pixels in the horizontal direction by 1125 lines in the vertical direction) is repeatedly picked up in frame cycles. Here, in the same way as when images are picked up at 60 frames per second, the image pickup signal of the valid region is a signal of 1080 lines taken from a predetermined line ("n line") out of the 1125 horizontal lines, but since the horizontal synchronization cycle is longer than when images are picked up at 60 frames per second, the part aside from the valid region in each horizontal line is longer. Here, the signal of one horizontal line is shown by the broken line Hb in FIG. 1A, for example.

When images are picked up at 24 frames per second, as shown in FIG. 1A, an image pickup signal of a region (d2+d3+d4) produced by further adding an image pickup region d4 on the right of the image pickup region d3 to the region (d2+d3) is outputted from a read unit of the image sensor. The range set as the valid image pickup region d1 is the same as for image signals at 60 frames per second.

Figure 1D:
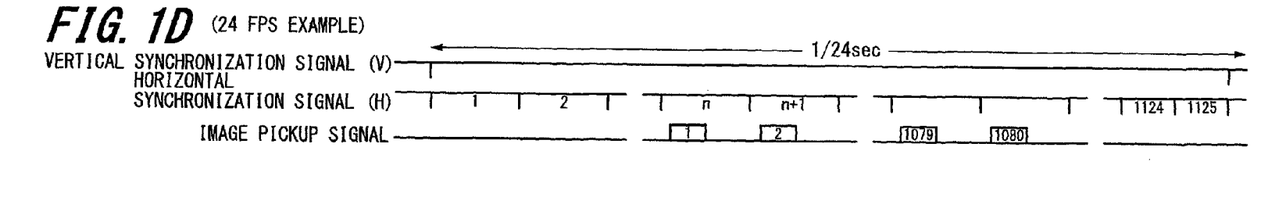

FIG. 1D shows the vertical synchronization signal V, the horizontal synchronization signal H, and the image pickup signal of the valid region, when obtaining an image signal at 24 frames per second. When obtaining an image signal at 24 frames per second, an image of an image pickup region d2+d3+d4 (that is, 2750 pixels in the horizontal direction by 1125 lines in the vertical direction) is repeatedly picked up in frame cycles. Here, in the same way as when images are picked up at 60 frames per second or 50 frames per second, the image pickup signal of the valid region is a signal of 1080 lines taken from a predetermined line ("n line") out of the 1125 horizontal lines, but since the horizontal synchronization cycle is even longer than when images are picked up at 50 frames per second, the part aside from the valid region in each horizontal line is extremely long. Here, the signal of one horizontal line is shown by the broken line Hc in FIG. 1A, for example.

By carrying out such image pickup processing, as the frame rate falls, the part that is not the valid image pickup region in each horizontal line (that is, the invalid region) increases, which makes it possible to change the frame rate even if the base clock frequency is fixed. That is, when obtaining an image signal at 50 frames per second or at 24 frames per second, the invalid regions (i.e., the regions d3, d4) are deleted from the image pickup signal read from the image sensor, and a correction process is carried out to extend the time axis of each horizontal line, and thereby an image signal with the stipulated frame rate is obtained.

In the processing shown in FIGS. 1A to 1D, it is possible to pick up images at a variety of frame rates by changing the horizontal synchronization cycle without changing the base clock frequency for driving the image sensor or read unit of the image sensor. By handling changes to the frame rate by changing the horizontal synchronization cycle without changing the base clock frequency in this way, control that changes the base clock frequency becomes unnecessary and it is possible to prevent flickering on the display.

PCT Publication WO2003-63471 discloses an existing image pickup apparatus that carries out control to change the frame rate. The publication states that by carrying out control that does not change the base clock frequency even when the frame rate changes, it is possible to prevent flickering on the display.

SUMMARY OF THE INVENTION

However, if the frame rate is changed by changing the horizontal synchronization cycle as shown in FIGS. 1A to 1D, there is the problem of increased image distortion when images of a moving subject are picked up and especially when the images are picked up at a lower frame rate. Such image distortion in moving subjects is a problem when an image sensor that outputs an image pickup signal in line sequence is used as the image sensor. Sensors that output an image pickup signal in line sequence include image pickup tubes and some CMOS (Complementary Metal Oxide Semiconductor) sensors. In recent years especially, CMOS image sensors have become increasingly widespread, so that a fairly large proportion of sensors now output an image pickup signal in line sequence.

Figure 2:
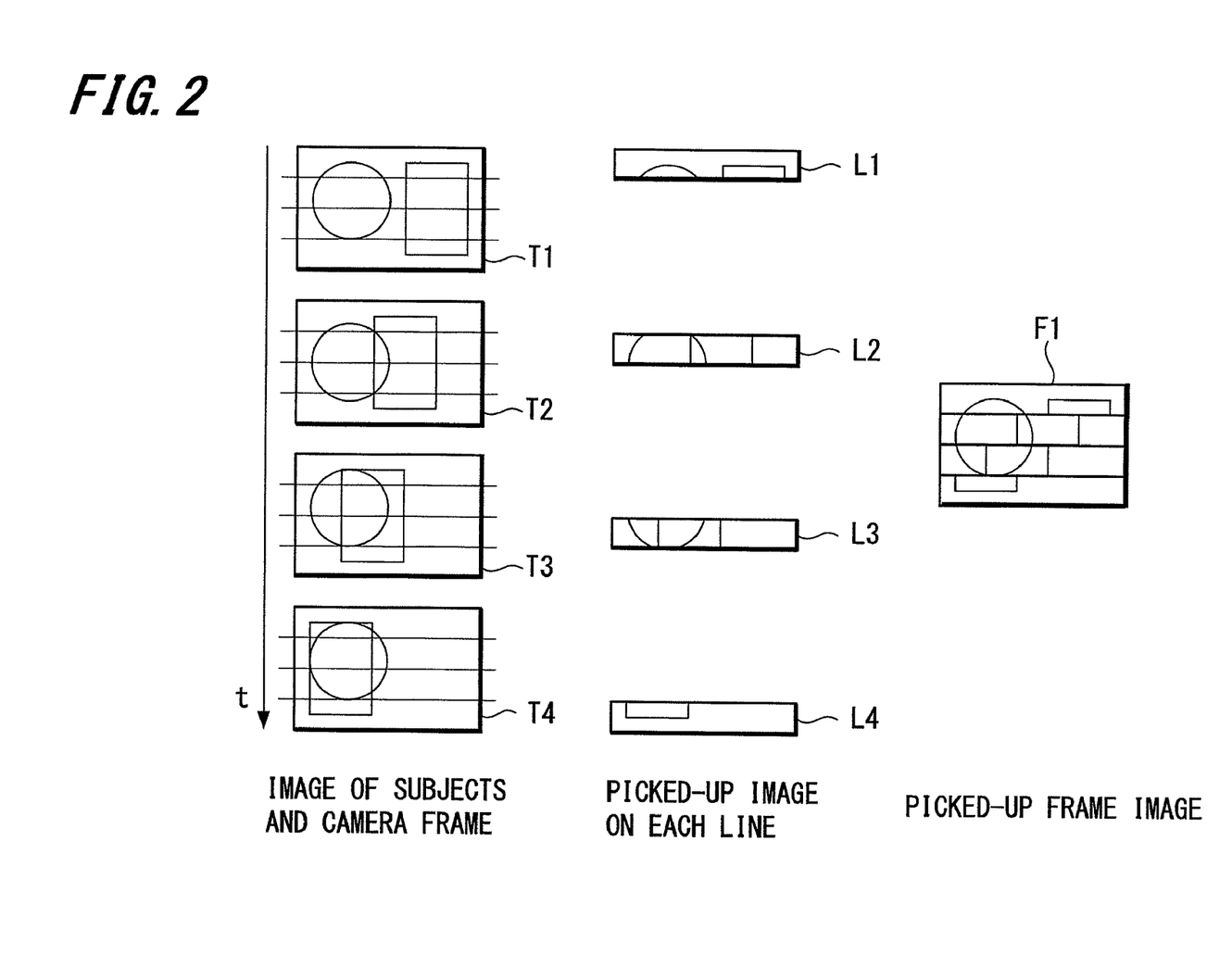
FIG. 2 is a diagram showing a picked-up image when images are picked up in line sequence.

FIG. 2 shows the principles behind the distortion of a moving subject when images are picked up in a line sequence method. This diagram shows how the timing at which each horizontal line is picked up differs when images are picked up in line sequence. That is, in the example in FIG. 2, a single image F1 is assumed to be composed of four horizontal lines numbered L1 to L4 and such horizontal lines L1 to L4 are picked up at the timings T1 to T4 that are respectively shifted in that order on a vertical time axis on the left side of FIG. 2. In this example, in the image to be picked up, the object represented by the circle is stationary and the object represented by the rectangle is moving from right to left.

As can be understood from the finally picked-up image F1 in FIG. 2, the picked-up image of the object represented by the rectangle becomes increasingly shifted toward the left from the top line L1 to the bottom line L4, and is therefore picked up as a distorted image. Although the distortion shown in FIG. 2 is especially problematic for a line sequence image sensor, if changes in the frame rate are handled by raising or lowering the horizontal synchronization cycle as shown in FIGS. 1A to 1D, there is a problem in that when images are picked up at a low frame rate, the distortion of the moving subjects becomes more prominent. In particular, when images are picked up at 24 frames per second, the cycle of one horizontal line is extremely long, so that the difference between the timing at which the first horizontal line is picked up and the timing at which the final horizontal line is picked up becomes extremely large, resulting in prominent distortion of moving subjects. Such increased distortion of moving subjects is undesirable.

The invention was conceived in view of the above-described and other problems and addresses the prevention of increased distortion of moving subjects when picking up images at a variety of frame rates without changing the base clock frequency.

According to an embodiment of the invention, an image pickup method of picking up images at a frame rate changeably set out of a plurality of frame rates is provided. The method includes the steps of:

setting a vertical synchronization cycle in accordance with a set frame rate and adding an image pickup signal that does not include a valid image pickup region in accordance with the set vertical synchronization cycle while keeping a horizontal synchronization cycle of each image pickup signal constant, when obtaining an image pickup signal from an image sensor; and correcting a time axis of an obtained image pickup signal that includes a valid image pickup region, correspondingly to the set frame rate and deleting an obtained image pickup signal that does not include the valid image pickup region.

By carrying out the above-described process, the period during which an image of the valid image pickup region is picked up in one frame will not change even if the frame rate is changed. Accordingly, even if image pickup is carried out using a line sequence image sensor at a low frame rate, there is no increase in the distortion of moving subjects within each frame.

According to the embodiment of the invention, even when the frame rate changes, the period for picking up the valid image pickup region in one frame is not changed, so that even if image pickup is carried out by a line sequence image sensor and a low frame rate is set, there is no increase in the distortion of moving subjects within each frame. Accordingly, it is possible to favorably pick up images with little distortion of moving subjects regardless of how the frame rate is set.

DESCRIPTION OF THE PREFERRED EMBODIMENTS

Figure 3:
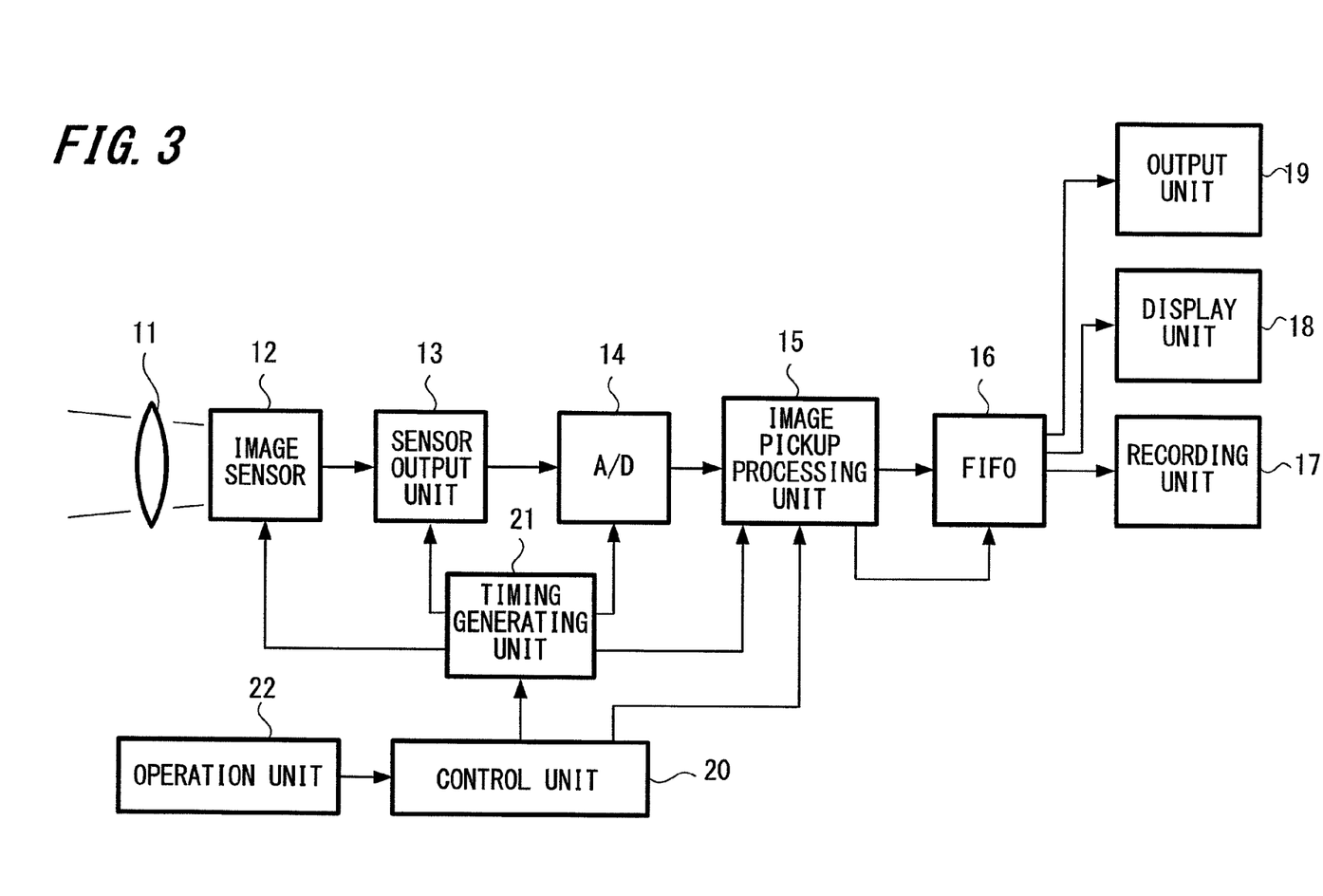
FIG. 3 is a block diagram showing an example construction of an image pickup apparatus according to an embodiment of the invention.

A preferred embodiment of the invention will now be described with reference to FIGS. 3 to 7. FIG. 3 is a block diagram showing one example of the construction of an image pickup apparatus according to an embodiment of the invention. In FIG. 3, an image focused on the pickup surface of an image sensor 12 via an optical system 11 including lenses and the like is converted to an electric signal by the image sensor 12 and the converted electric signal is read out by a sensor output unit 13. This electric signal read out by the sensor output unit 13 is referred to as the "image pickup signal". In the present embodiment, a sensor that reads out an image pickup signal in line sequence is used as the image sensor 12. Here, a CMOS image sensor is used as one example of a sensor that reads out an image pickup signal in line sequence. A construction may be used where a prism is used in the optical system 11 to split light into colors and a plurality of image sensors are provided as the image sensor 12. An image pickup process of the image sensor 12 and an output process for the image pickup signal by the sensor output unit 13 are driven by a timing generating unit 21. To do so, a driving clock is supplied from the timing generating unit 21.

The image pickup signal outputted from the sensor output unit 13 is supplied to an analog/digital converter 14 to be converted to a digital signal. The digitized image pickup signal is then supplied to an image pickup processing unit 15 where a variety of signal processing is carried out on the image pickup signal. The conversion process by the analog/digital converter 14 and the processing by the image pickup processing unit 15 are also carried out in synchronization with a clock supplied from the timing generating unit 21. The processing by the image pickup processing unit 15 is carried out under the control of a control unit 20, and after image processing, such as white balance correction and γ (gamma) correction, has been carried out, the signal is converted from an RGB primary color signal to a luminance/chroma (Y/C) signal.

The image pickup signal processed by the image pickup processing unit 15 is supplied to a memory 16 composed of a FIFO memory that outputs data in the order in which the data was inputted. A process that corrects the time axis of the image pickup signal is also carried out in the memory 16. A process, described later, that removes parts of horizontal lines that do not include the valid image region is also carried out. The process that removes (i.e., "trims") such parts of horizontal lines may be carried out by another circuit, such as the image pickup processing unit 15. The time axis correction process and horizontal line trimming process are carried out in the memory 16 in synchronization with a clock supplied from the image pickup processing unit 15.

By carrying out the time axis correction process in the memory 16, the image pickup signal outputted from the memory 16 is corrected to an image signal that conforms to a predetermined image signal format (i.e., a proper image signal for each frame rate). The image signal outputted by the memory 16 is supplied to a recording unit 17, recorded onto a disc, tape, memory, or the like, displayed on a display unit 18, and is outputted from an image signal outputting unit 19.

Image pickup by this image pickup apparatus is carried out according to control by the control unit 20. The control unit 20 controls image pickup by being supplied with instructions, such as start and stop image pickup, from an operation unit 22. An operation that sets an image pickup mode can also be made via the operation unit 22, with a mode corresponding to such operation being set by the control unit 20.

As the image pickup modes in the present embodiment, three image pickup modes are provided; an image pickup mode where images are picked up at 60 frames per second, an image pickup mode where images are picked up at 50 frames per second, and an image pickup mode where images are picked up at 24 frames per second.

In accordance with the mode that has been set, the control unit 20 instructs the timing generating unit 21 to generate corresponding driving signals and a clock to drive respective circuits in keeping with the mode. However, in the present embodiment, a pixel clock that is the base clock generated by the timing generating unit 21 is the same in every mode. In addition, a horizontal clock that determines the cycle of the horizontal synchronization signal (i.e., horizontal synchronization cycle) is also the same in every mode. The period for which images are picked up by the image sensor 12 is set at a suitable period for the set mode. The horizontal clock and the like will be described in more detail later in this specification.

FIGS. 4A to 4D are diagrams showing a variable frame rate image pickup process according to the present embodiment.

Figures 4A, 4B:
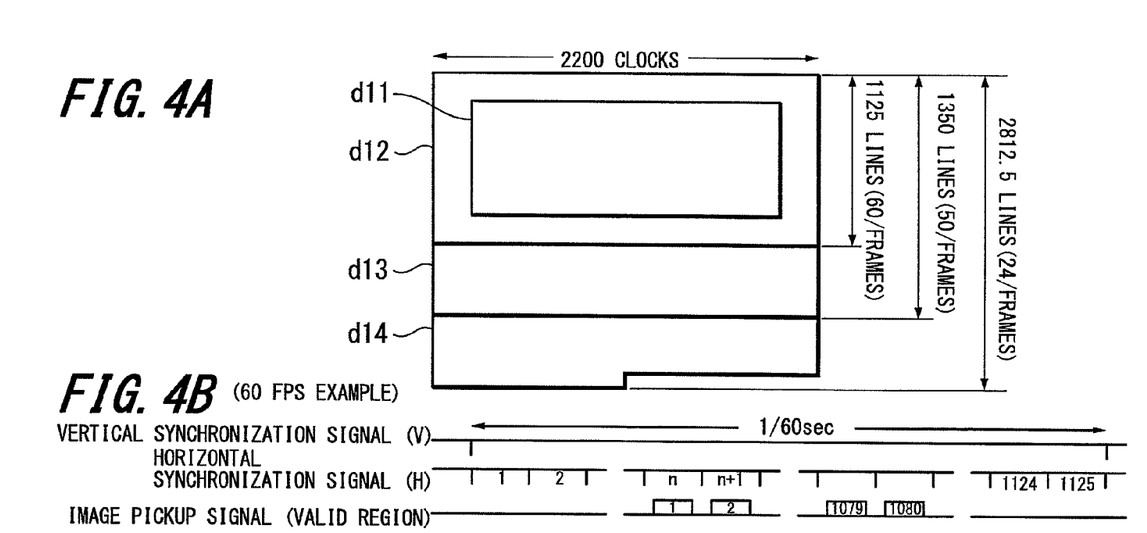
FIGS. 4A to 4D are a diagram and timing charts showing examples of image pickup processing according to an embodiment of the invention.

FIG. 4A shows an image of one frame in the image pickup signal according to the present embodiment. A valid image pickup region d11 with predetermined numbers of pixels in the horizontal direction and the vertical direction is set for the image pickup signal of one frame. The numbers of pixels in the horizontal direction and the vertical direction in the valid image pickup region d11 are the same in each frame rate. As one example, assume that the valid image pickup region d11 includes 1920 pixels in the horizontal direction and 1080 horizontal lines in the vertical direction.

When images are picked up at 60 frames per second, a slightly wider image pickup region d12 than the valid image pickup region d11 is set as shown in FIG. 4A. The image pickup region d12 is 2200 pixels wide in the horizontal direction and has 1125 horizontal lines in the vertical direction, for example. An image pickup signal in which this image pickup region d12 is set is the image pickup signal that is to be outputted regardless of the frame rate.

According to the present embodiment, when images are picked up at 50 or 24 frames per second, the vertical synchronization cycle is set according to a set frame rate, and an image pickup signal of image pickup regions d13, d14, added below the base image pickup region d12 when the image pickup region of one frame is viewed as shown in FIG. 4A, is obtained. Adding the image pickup regions d13, d14 below the base image pickup region d12 in this way corresponds to increasing the number of horizontal lines in one frame while keeping the horizontal synchronization cycle fixed for every frame rate. Since lines are added below the base image pickup region d12, a number of horizontal lines that do not compose the valid image pickup region and that correspond to the lines in the image pickup region d13 or the lines in the image pickup region d13+d14 are added after the horizontal lines in which the valid image pickup region d11 is present.

Next, a specific example of image pickup in each mode will be described with reference to FIGS. 4B to 4D.

FIG. 4B shows the vertical synchronization signal V, the horizontal synchronization signal H, and an image pickup signal of the valid region, when obtaining an image signal at 60 frames per second. For an image signal at 60 frames per second, image pickup of the image pickup region d12 (that is, 2200 pixels in the horizontal direction by 1125 lines in the vertical direction) is repeated in each frame cycle. The image pickup signal of the valid region is a signal of 1080 lines taken from a predetermined line ("n horizontal line") out of the 1125 horizontal lines.

Figure 4C:
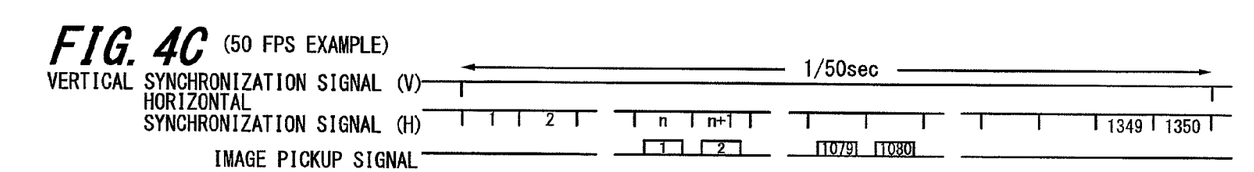

FIG. 4C shows the vertical synchronization signal V, the horizontal synchronization signal H, and the image pickup signal of the valid region, when obtaining an image signal at 50 frames per second. When picking up images at 50 frames per second, as shown in FIG. 4A, an image pickup signal of a region (d12+d13) produced by adding the image pickup region d13 below the image pickup region d12 is outputted from the read unit of the image sensor 12. The horizontal lines in the image pickup region d13 are horizontal lines that do not include the valid image pickup region. The region set as the valid image pickup region d11 is the same as for the image signal at 60 frames per second. The number of horizontal lines in the image pickup region d12+d13 is 1,350.

Figure 4D:
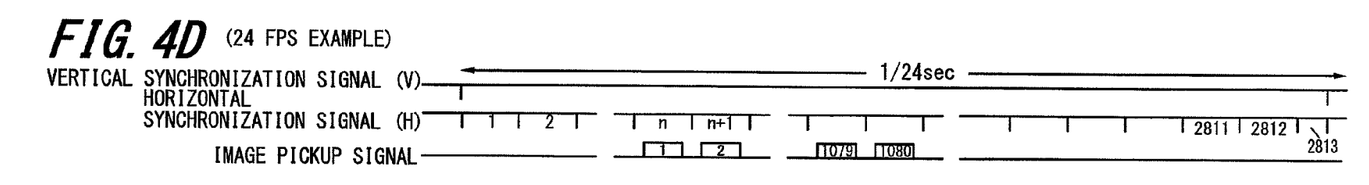

FIG. 4D shows the vertical synchronization signal V, the horizontal synchronization signal H, and the image pickup signal of the valid region, when obtaining an image signal at 24 frames per second. When picking up images at 24 frames per second, as shown in FIG. 4A, an image pickup signal of a region (d12+d13+d14) produced by further adding an image pickup region d14 below the image pickup region d13 is outputted from the read unit of the image sensor 12. The horizontal lines in the image pickup regions d13 and d14 are horizontal lines that do not include the valid image pickup region. The region set as the valid image pickup region d11 is the same as for the image signal at 60 frames per second. The number of horizontal lines in the image pickup region d12+d13+d14 is 2,812.5. Here, the horizontal synchronization cycle of the $2,813^{th}$ (i.e., final) horizontal line is halved to make the frame rate equal to 50 frames per second.

The frequency of the horizontal lines and the number of pixels on one horizontal line shown in FIG. 4A are set for an example where the base clock frequency is 148.5 MHz (or half of this which is 74.25 MHz). In the present embodiment, the number of horizontal lines is set according to the following equation;

number of horizontal lines=[(base clock frequency)÷(frame rate)]÷(number of horizontal clocks)

For an image signal with 24 frames per second, the calculation results in the fraction given above.

When the image pickup mode of 60 frames per second is set, the image pickup signal outputted from the sensor output unit 13 in this way is supplied to the recording unit 17, the display unit 18, and the image signal outputting unit 19 as an image signal that has been processed without changing the number of horizontal lines.

When the image pickup mode of 50 frames per second is set and when the image pickup mode of 24 frames per second is set, in the (FIFO) memory 16 correction is carried out to extend the time axis of the valid image pickup region d11 and the added region d13 or region d13+d14 is deleted.

Figure 5A:
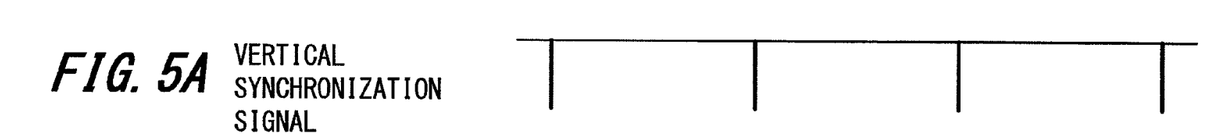
FIGS. 5A to 5C are timing charts showing examples of processing by a FIFO according to an embodiment of the invention.
Figure 5B:
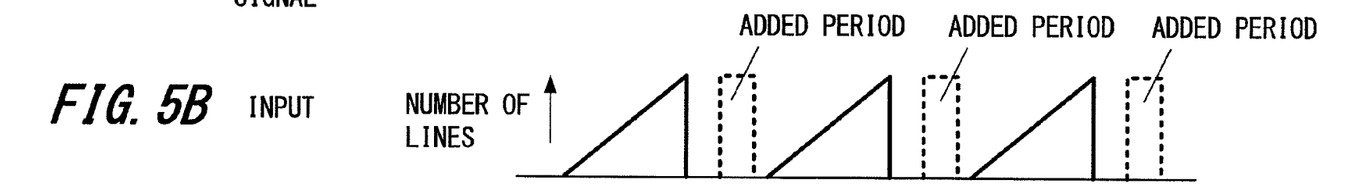
Figure 5C:
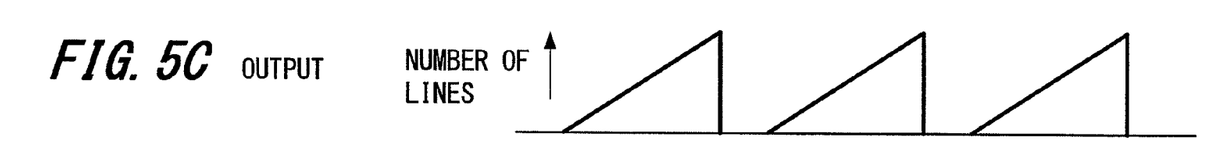

FIGS. 5A to 5C are diagrams showing a processing example in the memory 16. FIG. 5A shows cycles of the vertical synchronization signal inputted into the memory 16. The cycle of the vertical synchronization signal is not changed in the memory 16. As shown by the triangles in FIG. 5B, for the image pickup signal inputted into the memory 16, the number of lines of the region d12 that includes the valid image pickup region d11 changes inside each frame period, and the added region d13 or d13+d14 is present at the end of each frame period.

In this state, inside the memory 16, each horizontal line in the region d12 including the valid image pickup region d11 is extended and the added region d13 or d13+d14 is deleted. The image pickup signal for which these extending and deleting processes have been carried out is outputted from the memory 16 as shown in FIG. 5C.

By correcting the time axis in accordance with the mode and deleting the region added during image pickup, using the memory 16 and the like in this way, a proper image signal for each mode is outputted. In the present embodiment, the period for picking up the valid image pickup region d11 in one frame is the same regardless of the frame rate. Therefore, even if an image sensor 12 that picks up images in line sequence is used, there is no increase in the distortion of moving subjects.

Note that although an example of processing where an image pickup signal is read out in line sequence has been described for the example in FIGS. 4A to 4D, it is also possible to use a construction where two horizontal lines are simultaneously read out.

Figure 6A:
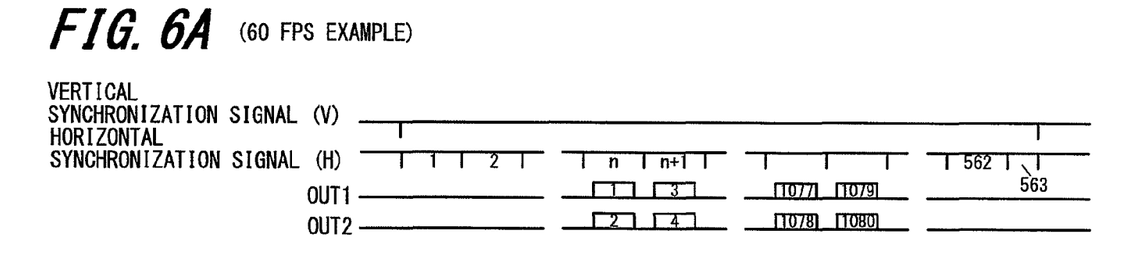
FIGS. 6A to 6C are timing charts showing examples of processing where two lines are simultaneously read out according to an embodiment of the invention.
Figure 6B:
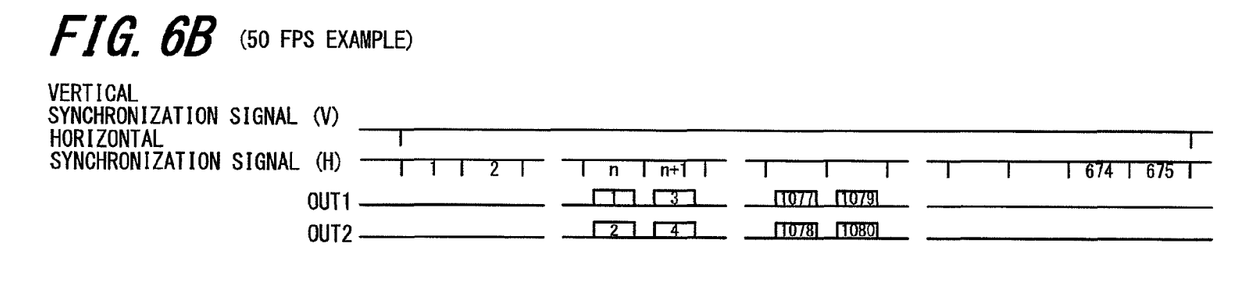
Figure 6C:
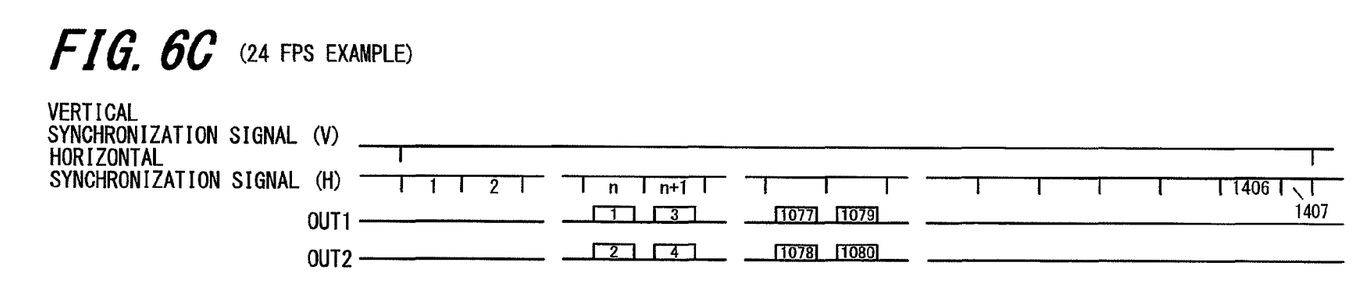

FIGS. 6A to 6C show an example where two horizontal lines are simultaneously read out. FIG. 6A shows an example of a mode for images at 60 frames per second, FIG. 6B shows an example of a mode for images at 50 frames per second, and FIG. 6C shows an example of a mode for images at 24 frames per second.

In the modes shown in FIGS. 6A to 6C, the outputs OUT1, OUT2 are image pickup signal outputs in which two horizontal lines are simultaneously read out, each output outputting an image pickup signal of every other line. Since two horizontal lines are simultaneously read out in each mode, only half the time is required for the vertical synchronization period in which the signal of one frame is read out, and it is therefore possible to make a corresponding reduction in the distortion of moving subjects described above. By combining the output of the two horizontal lines so as to be in line sequence in the image pickup processing unit 15, a progressive scan (non-interlaced) image pickup signal with the stipulated number of horizontal lines is produced. Note that by using only one horizontal line out of an image pickup signal where two lines are simultaneously outputted, an interlaced image pickup signal can be produced. Also, although a construction where two horizontal lines are simultaneously read out has been described above, a construction that simultaneously reads out three or more horizontal lines is also possible.

Also, although the output of the image pickup processing unit 15 is supplied to the FIFO memory 16 where the time axis is corrected to produce the proper image signal in the construction of the image pickup apparatus shown in FIG. 3, the positions of the image pickup processing unit 15 and the memory 16 may be reversed.

Figure 7:
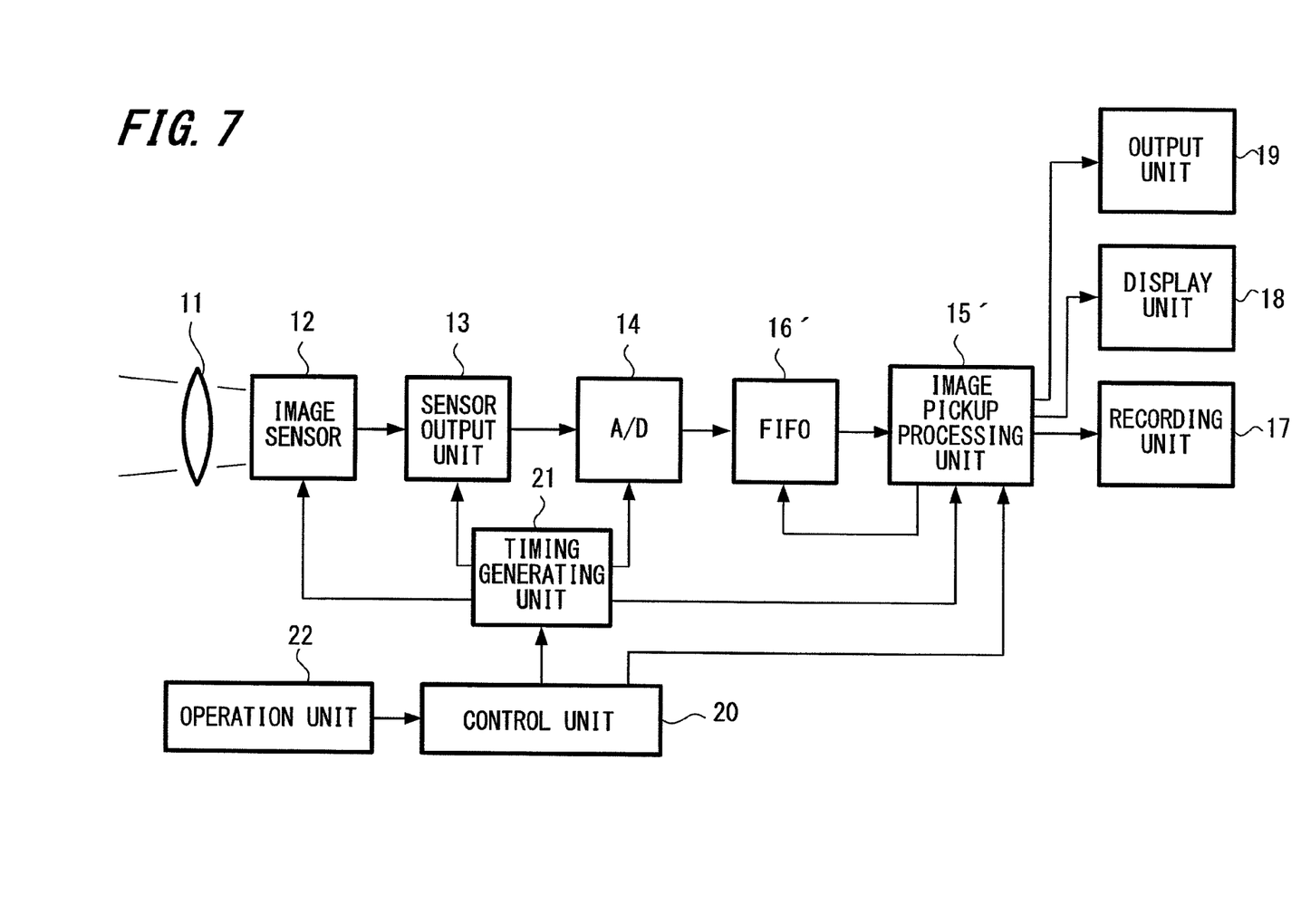
FIG. 7 is a block diagram showing an example construction of an image pickup apparatus according to another embodiment of the invention.

That is, as shown in FIG. 7, for example, it is possible to use a construction where an output of the analog/digital converter 14 is supplied to a FIFO memory 16' where correction of the time axis and deletion of the added regions are carried out before the signal is supplied to an image pickup processing unit 15' where a variety of image pickup processing is carried out. By using the construction shown in FIG. 7, the image pickup processing unit 15' can have exactly the same processing construction as an existing pickup processing unit that is compatible with a plurality of frame rates. With the construction shown in FIG. 3, since the added region is included in the input signal, processing of such regions is required.

Also, in the example shown in FIGS. 4A to 4D and described in the above embodiment, the final horizontal line in one frame is a half line when obtaining an image signal at 24 frames per second. As the method of producing such fraction, it is also possible to divide up the number of horizontal clocks cycles corresponding to half a horizontal line (i.e., 1100 clock cycles) as one clock cycle each for 1100 lines and to increase the number of pixel clock cycles for such lines by one.

Alternatively, instead of minimizing the number of horizontal clock cycles, as examples, it is possible to pickup images at 24 frames per second by setting a rectangular region of 2750 lines or 2475 lines with one horizontal line as 2250 or 2500 clock cycles.

In the embodiment described above, examples of image pickup at 60 frames per second, image pickup at 50 frames per second, and image pickup at 24 frames per second are given, but it is also possible to apply an embodiment of the invention to an image pickup apparatus that sets a plurality of other frame rates. The numbers of clock cycles (i.e., the numbers of pixels) in one horizontal line given above are also merely examples and an embodiment of the invention is not limited to such numbers of clock cycles.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   a control unit that changeably sets one out of a plurality of frame rates;
   an image sensor that picks up an image of a region including a valid image pickup region at a frame rate set by the control unit;
   an output unit that reads out an image pickup signal from the image sensor;
   a timing setting unit that sets a vertical synchronization cycle in accordance with the frame rate set by the control unit and adds an image pickup signal that does not include the valid image pickup region in accordance with the set vertical synchronization cycle while keeping a horizontal synchronization cycle of each image pickup signal outputted by the output unit constant; and
   a time axis correcting unit that corrects a time axis of an image pickup signal including the valid image pickup region, outputted from the output unit, correspondingly to the set frame rate, and deletes the image pickup signal that does not include the valid image pickup region, added by the timing setting unit.

2. The image pickup apparatus according to claim 1, further comprising an image pickup signal processing unit that carries out image pickup signal processing on the image pickup signal outputted by the output unit,
   wherein the time axis correcting unit corrects the time axis of the image pickup signal that has been processed by the image pickup signal processing unit.

3. The image pickup apparatus according to claim 1,
   further comprising an image pickup signal processing unit that carries out image pickup signal processing on the image pickup signal outputted by the output unit,
   wherein the output unit is configured to simultaneously outputs image pickup signals of a plurality of horizontal lines, and the image pickup signal processing unit combines the image pickup signals of a plurality of horizontal lines in a predetermined order to produce an image pickup signal.

4. The image pickup apparatus according to claim 1,
   further comprising an image pickup signal processing unit that carries out image pickup signal processing,
   wherein the time axis correcting unit carries out correction on the image pickup signal outputted by the output unit, and the image pickup signal processing unit carries out the image pickup signal processing on the image pickup signal corrected by the time axis correcting unit.

5. An image pickup method of picking up images at a frame rate changeably set out of a plurality of frame rates, the method comprising the steps of:
   setting a vertical synchronization cycle in accordance with a set frame rate and adding an image pickup signal that does not include a valid image pickup region in accordance with the set vertical synchronization cycle while keeping a horizontal synchronization cycle of each image pickup signal constant, when obtaining an image pickup signal from an image sensor; and
   correcting a time axis of an obtained image pickup signal that includes a valid image pickup region, correspondingly to the set frame rate and deleting an obtained image pickup signal that does not include the valid image pickup region.

* * * * *